United States Patent [19]

Cunliffe et al.

[11] 4,107,142

[45] Aug. 15, 1978

[54] EPOXIDE MATERIALS

[75] Inventors: Anthony Vernon Cunliffe, Datchworth, England; Peter John Pearce, Innisfail, Australia; David Hugh Richards, Bishops Stortford, England

[73] Assignee: National Research Development Corporation, London, England

[21] Appl. No.: 685,674

[22] Filed: May 12, 1976

Related U.S. Application Data

[63] Continuation-in-part of Ser. No. 523,528, Nov. 13, 1974, abandoned.

[30] Foreign Application Priority Data

Nov. 14, 1973 [GB] United Kingdom ............... 52910/73

[51] Int. Cl.$^2$ ..................... C08G 67/00; C08K 5/15; C08F 24/00
[52] U.S. Cl. .................... 528/93; 260/30.4 EP; 260/33.2 EP; 260/32.6 N; 260/47 EN; 260/348.11; 260/836; 528/393; 526/173; 526/273; 528/88; 528/106; 528/121; 528/205
[58] Field of Search ............... 526/173, 11.2, 273; 260/47 EP, 836, 47 EN, 348 R

[56] References Cited

U.S. PATENT DOCUMENTS

| | | | |
|---|---|---|---|
| 3,803,110 | 4/1974 | Richards et al. | 526/11.1 |
| 3,833,405 | 9/1974 | Lee et al. | 260/47 EP |
| 3,843,594 | 10/1974 | Labana et al. | 526/273 |
| 3,846,393 | 11/1974 | Milkovich et al. | 526/173 |
| 3,932,557 | 1/1976 | Matthews | 260/47 EP |

*Primary Examiner*—Herbert J. Lilling
*Attorney, Agent, or Firm*—Cushman, Darby & Cushman

[57] ABSTRACT

Epoxide materials suitable for use in flexible adhesives are prepared by reacting a diene, such as butadiene or isoprene, with an electron donor, typically an alkali metal, in the presence of a polyepoxide normally in a molar ratio diene:polyepoxide of less than 3:1. The polyepoxide is typically a conventional epoxy resin such as DGBA. The product normally separates into two phases, the upper of which comprises epoxy-terminated diene oligomers with degrees of polymerization of about 6 to 14. This separation may be avoided by incorporating a minor proportion of acrylonitrile into the product by addition to either the original diene or the anionic living polymer immediately before hydrolysis. The products may be cured with conventional epoxide curing agents to give an internally flexibilized adhesive having useful combinations of tensile and shear strengths.

17 Claims, 4 Drawing Figures

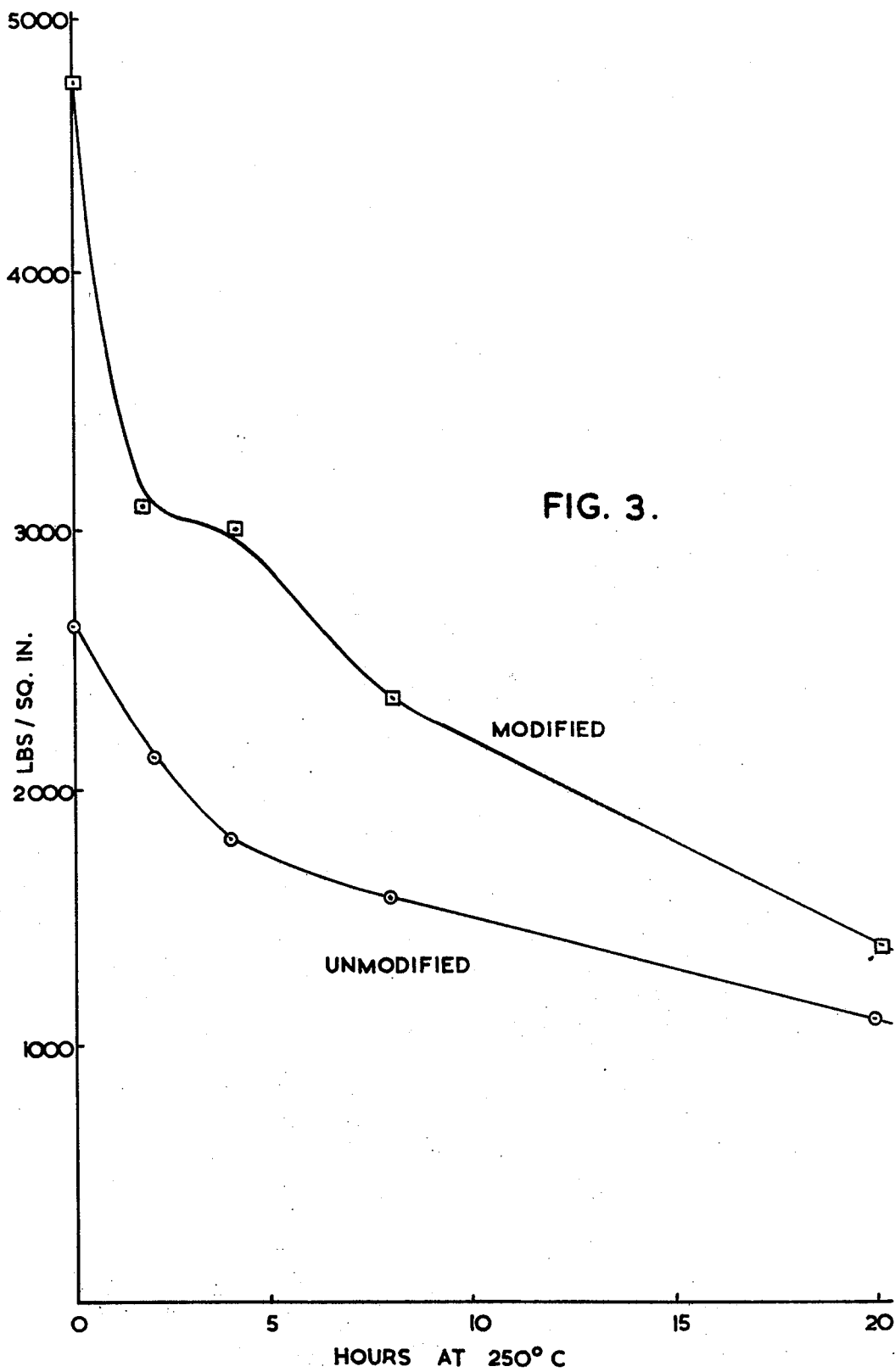

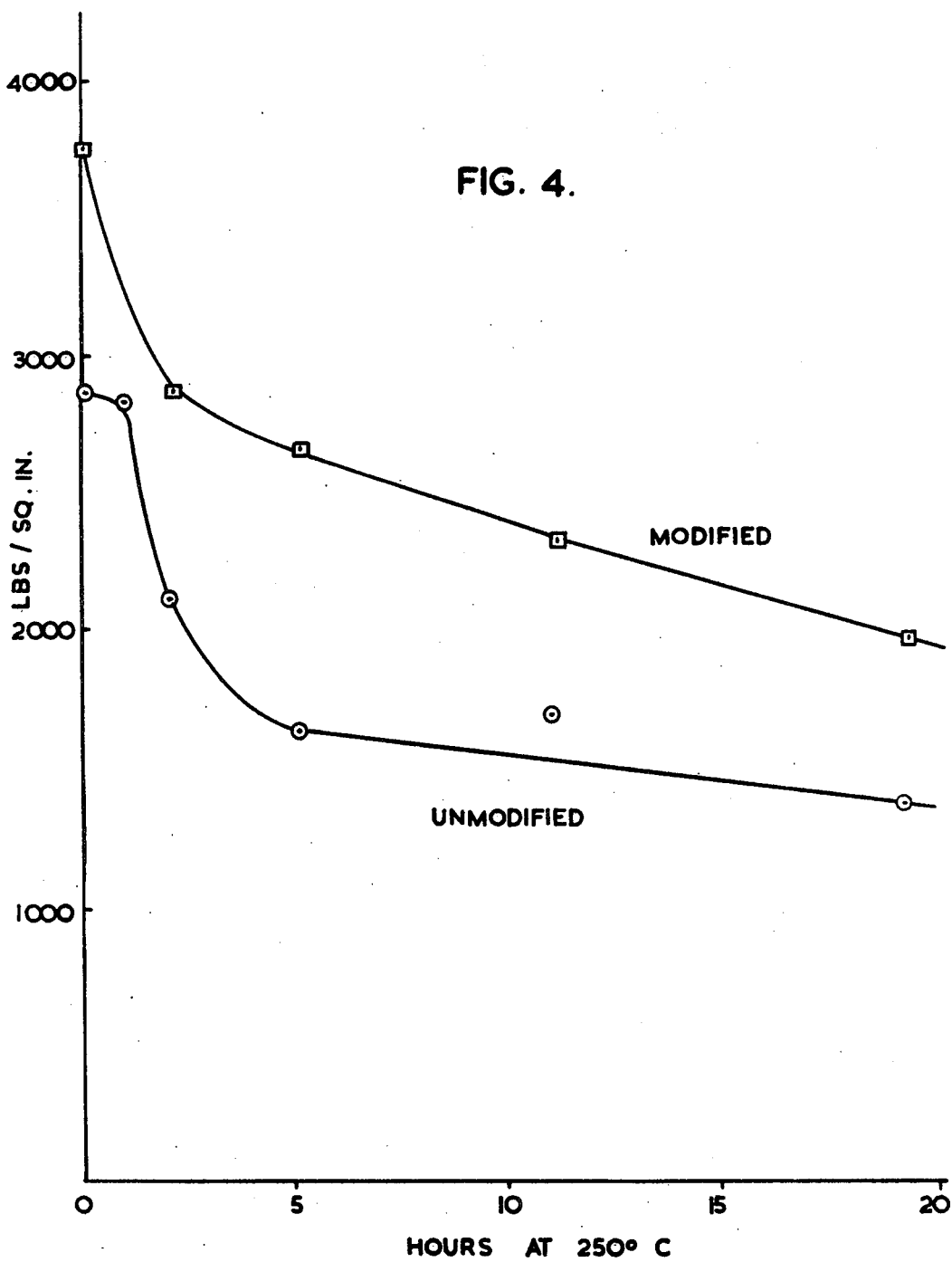

EPOXIDE MATERIALS

The application is a continuation-in-part of U.S. Application Ser. No. 523,528 filed 13 Nov. 1974, now abandoned.

The invention relates to modified epoxide materials, suitable for use in epoxide adhesives.

Epoxide adhesives, comprising polyepoxides, termed epoxy resins, cross-linked with curing agents such as acid anhydrides or amines, are widely used for bonding a wide range of materials. Although the bonds produced by epoxide adhesives are generally strong they lack flexibility and hence strength under shear loads. Attempts have been made to improve flexibility by using unsaturated polymers, especially diene polymers such as butadiene, which have been epoxidised at one or more of the unsaturated chain linkages. The resulting epoxidised polymer, however, generally has epoxide groupings only within the polymer chain and in any event lacks the high epoxide reactivity of epoxide groupings, especially the glycidyl ether grouping, normally found in epoxy resins used in adhesives. In addition the epoxide groups may be introduced into the polymer chain at any point resulting in variable degree and site of epoxidation. This may result in variable cross-linking patterns and hence properties on curing.

U.S. Pat. No. 3,803,110 teaches that when an alkene is reacted with an electron donor in the presence of a diepoxide, alkene dicarbanions consisting of normally two, but up to four, alkene residues are initially formed, but rapidly react with the diepoxide to form a copolymer in which the diepoxide molecules are enclosed in the chain between the dicarbanion groupings. Thus substantially all the epoxide functionality is lost from the resulting copolymer.

It has now been surprisingly found that when it is attempted to carry out a reaction as described in U.S. Pat. No. 3,803,110 between a polyepoxide and a diene, rather than a mono alkene such as styrene, the product comprises predominantly epoxy-terminated telomers containing more than four diene residues per molecule and with virtually all the polyepoxide molecules in terminal positions. Moreover, in further contradiction to the teaching of U.S. Pat. No. 3,803,110, the diene chain length (and hence molecular weight) of the product is relatively insensitive to the reaction conditions, especially the molar ratio of diene to diepoxide. The products retain at least one of the epoxide groups unchanged in a terminal position and hence the reaction may be used to prepare flexible epoxide adhesives having highly reactive terminal epoxide groups.

In accordance with the present invention a process for the production of an epoxide material suitable for use in an adhesive composition comprises reacting, under substantially anhydrous conditions in a polar aprotic solvent, a diene with an electron donor in the presence of a polyepoxide to form an epoxy-terminated living polymer and subsequently hydrolysing the living polymer so formed. The diene is preferably a conjugated diene such as butadiene or especially isoprene. The term "polyepoxide" as used herein denotes a compound containing at least two epoxide groups. In most cases the polyepoxide will be a diepoxide and should preferably be a diglycidyl ether. However triepoxides and polyepoxides of higher functionality may also be used. The electron donor will normally be an alkali metal, especially lithium or sodium, or an amalgam thereof, but may alternatively be an electrolytic cell cathode. The reaction will normally be carried out at temperature within the range −40° to +100° C, preferably −20° to +10° C. The polar aprotic solvent may, for example, be tetrahydrofuran, diglyme, dioxan or tetramethylene diamine and may be used alone or mixed with a minor or major proportion of an inert diluent such as hexane. The reaction should normally be carried out under an inert atmosphere substantially free from oxygen or carbon dioxide, for example argon, helium or, for economy, nitrogen. However since the anions produced during the reaction are produced in relatively large quantities and are relatively short lived, the requirement for an inert atmosphere is less stringent than in conventional anionic polymerisation processes and useful yield may be obtained even in the presence of oxygen. The hydrolysis may be achieved by adding conventional reagents such as methanol or brine.

The chain lengths of the diene telomers vary slightly with the diene used and the ratio of diene to polyepoxide, but a molar ratios of less than about 3:1 two phases are normally formed each having the general formula:

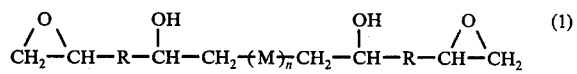

(1)

wherein R represents the divalent residue between the epoxide groups of the polyepoxide, M represents a divalent residue formed by addition to the diene and n a number average value in the range 5 to 20, generally below 14, and especially 6 to 10, for the upper phase and about 0.5 for the lower phase. It is found that variations in the molar ratio result in differing proportions of these phases, but little variation in the composition of the phases provided there is an excess of polyepoxide over that required by formula (1) above. However ratios in the range 0.75:1 to 1.5:1 are preferred since the phases are then produced in a ratio which gives particularly good adhesive properties on re-blending.

In preparing adhesives the upper, more highly polymerised phase may be used alone. However this results in an adhesive of high flexibility but low tensile strength. To achieve higher tensile strength the upper phase should be blended before use with further epoxide, or conveniently, the lower phase. Thus a predetermined combination of shear strength and tensile strength may be obtained by blending the upper and lower phases in suitable proportion whilst the two phases can be obtained in the desired proportions by adjusting the diene to diepoxide molar ratio.

According to a preferred embodiment of the invention, however, the product may be obtained as a single phase showing no tendency separate on standing, by incorporating a minor proportion of a nitrile-substituted alkene such as acrylonitrile. This may be added either to the original reaction mixture including the electron donor or to the living polymer prior to hydrolysis. In the latter case the electron donor should first be removed to avoid homopolymerisation of the nitrile-substituted alkene. The molar ratio of diene to nitrile-substituted alkene should preferably be greater than 1:1 especially about 2:1. Higher molar ratios may be used, but above 5:1 separation into two phases on prolonged standing may occur. Above 10:1 there is no significant advantage obtained from the addition of the nitrile-substituted alkene.

It is believed, although it should be understood that the invention is in no way limited by or to this explanation, that the presence of the nitrile-substituted alkene in the more highly polymerised (upper phase) material increases its solubility in the lower phase material, whether it be included in the diene chain (when added to the initial mixture) or as a side chain on the hydroxyl group of formula (1) above.

Whilst the epoxide materials in accordance with the present invention are particularly suitable for use in adhesive, they may also be useful in other applications for which epoxy resins are commonly employed, for example as surface coatings or in matrices of fibre-reinforced composite materials.

The epoxide materials produced in accordance with the invention may be cured using conventional epoxide curing systems such as aliphatic amines, for example triethylene tetramine; aromatic amines, for example 4,4′ diamino-diphenylamine; polyamides; carboxylic acids; acid anhydrides, such as hexahydrophthalic anhydride; or Lewis acid catalyst systems such as boron trifluoride-ethylamine. The resulting bonds have increased shear strengths both at room temperature and at elevated temperature when compared with bonds produced by curing the unmodified polyepoxide under similar conditions.

A typical process in accordance with the present invention using diepoxide starting materials will now be described by way of example and the properties of the products compared with those of the original diepoxide.

EXAMPLE 1

The epoxide used was the diglycidyl ether of bisphenol A (Epikote 828 supplied by Shell Chemical Co) comonly used in epoxide adhesive systems and hereinafter referred to as DGBA.

The apparatus comprised a multi-necked one litre flanged flask fitted with a stirrer and modified by forming in the wall of the flask about 100 indentations projecting into the flask as "spikes". By stirring the reaction medium the solid metal pieces were repeatedly caused to collide with these spikes and thereby to be cleared of any inactivating surface coating.

The flask was charged with 500 ml of tetrahydrofuran containing 140 grms (0.4 moles) of DGBA and cooled to 0° C whilst purified nitrogen was bubbled through to maintain an inert atmosphere. With the temperature maintained at 0° C and with constant stirring a two fold excess (0.8 moles) of sliced sodium metal was added followed by 27.2 g (0.4 moles) of isoprene. The nitrogen flow was then stopped and the flask sealed. Following a short induction period, the surface of the sodium assumed a yellow aspect indicating that reaction had commenced.

After about 3 hours the reaction mixture became fairly viscous with signs of gel formation and the metal surface had reverted to a dull grey. A few mls of methanol were then added to disperse the gel and lower the viscosity and the excess sodium was removed by filtration to leave a clear orange-brown solution. Most of the solvent was removed on a rotary film evaporator and the residue was shaken with saturated brine to effect hydrolysis. The organic layer was extracted with ether and shaken with portions of saturated brine until the washings were neutral. Finally the ether extract was dried over anhydrous magnesium sulphate and evaporated under vacuum to yield 145 grms of modified epoxy resin (87% yield) of epoxy content 3.90 equivalents per kilo compared with 5.2 equivs/kg for the original DGBA. A separate experiment wherein DGBA was mixed with sodium without isoprene showed no decrease in epoxy content. On standing the modified resin separated into two layers the upper layer comprising about 21% by volume.

The layers were separated and analysed qualitatively by gel-permeation chromatography and quantitatively for epoxide content (as described by Jay, Anal Chem 1964, 36, p 667) and isoprene content by NMR using total aromatic/aliphatic hydrogen ratio. The top layer was composed mainly of polymeric material with a small proportion of free DGBA. It had an epoxy content of 1.56 equivs/kg and an aromatic hydrogen ratio of 0.15:1. These results suggest that the majority of the DGBA incorporated in the polymer was in terminal positions with a average degree of polymerisation of the isoprene of about 6. The lower layer comprises mainly unchanged DGBA with some polymeric material of only slightly lower molecular weight to the upper layer. The epoxide content was 4.26 equivs/kg and the aromatic/aliphatic ratio 0.39:1. This suggest an average degree of polymerisation of 0.5, but this is probably of no significance in view of the gel-permeation chromatography results.

The two layers were blended together and used to bond pairs of mild steel plates each measuring 4 ins. by 1 in. (prepared by chloroform degreasing and sandblasting) by means of a ½ inch lap joint using various curing systems. The shear strengths of the bonds compared with those given by the original DGBA alone (all at a cross-head speed of 5mm/min) are given in Table 1.

TABLE 1

| Curing System | Shear Strength (psi) | | | |
|---|---|---|---|---|
| | Modified Average | Material Maximum | Un-Modified Average | DGBA Maximum |
| Aliphatic Amine | | | | |
| (Triethylene tetramine) | | | | |
| without post-cure | 3982 | 4156 | 1879 | 2143 |
| with post-cure 2(hrs. at 150° C) | 4952 | 5180 | 2577 | 2734 |
| Aromatic Amine | | | | |
| 4,4′diamino-diphenylmethane | 3540 | 3748 | 2259 | 2571 |
| Polyamide | | | | |
| "Versamid 140" (Cray Valley Prod) | 4539 | 4751 | 3635 | 3845 |
| Anhydride | | | | |
| Hexahydrophthalic anhydride | 4626 | 4906 | 2862 | 2987 |
| Catalytic | | | | |
| Boron trifluoride-ethylamine | 2852 | 3009 | 2537 | 2657 |

In a further experiment the two layers of the modified material were separated. The upper layer was then mixed with varying percentages (by volume) of either the lower layer or unmodified DGBA. These mixtures were then tested for shear strength as described above, using tetraethylene tetramine (TETA) cure with postcure for 2hrs at 150° C. (Mixtures containing 50% or more of upper layer were difficult to mix) The resulting shear strengths (in psi) are shown in Table 2.

TABLE 2

| | %(v/v) of top layer | | | | | |
|---|---|---|---|---|---|---|
| | 0 | 10 | 20 | 30 | 40 | 50 |
| Blended with | | | | | | |
| Lower layer | 3271 | 4401 | 4952 | 4451 | 3814 | 1049 |
| DGBA | 2577 | 3676 | 3977 | 3337 | 3191 | 3010 |

The modified DGBA produced by the process of example 1 and unmodified DGBA were cast into dumbbell test pieces with TETA and tested for tensile strength. Whilst the tensile strength of the modified material was 6330 psi compared with 8250 for the original DGBA, the elongation at break was 12% compared with less than 5%.

When tested for shear strength at room temperature after exposure to elevated temperatures, cured modified DGBA showed generally superior strength to the unmodified material as shown by the drawings filed with the provisional specification in which:

BRIEF DESCRIPTION OF THE DRAWINGS

FIG. 3 shows the residue at 250° C for joints cured with hexahydrophthalic anhydride, and FIG. 4 shows the results also at 250° C for joints cured wth methylene dianiline.

EXAMPLE 2

Figure 1:
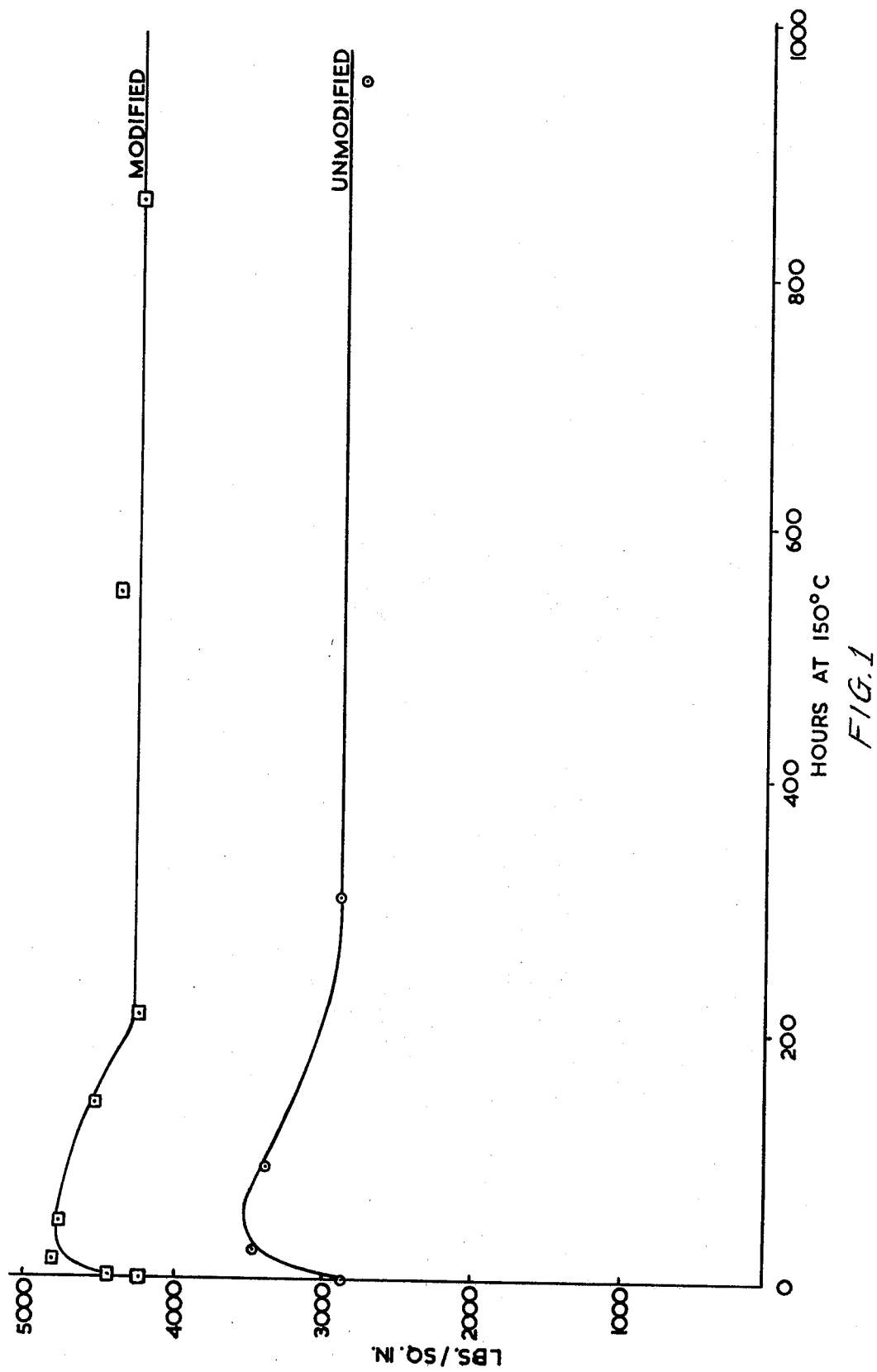
FIG. 1 shows the change of shear strength with time at 150° C for ½" lap joints of mild steel bonded by TETA - cured modified and unmodified DGBA.
Figure 2:
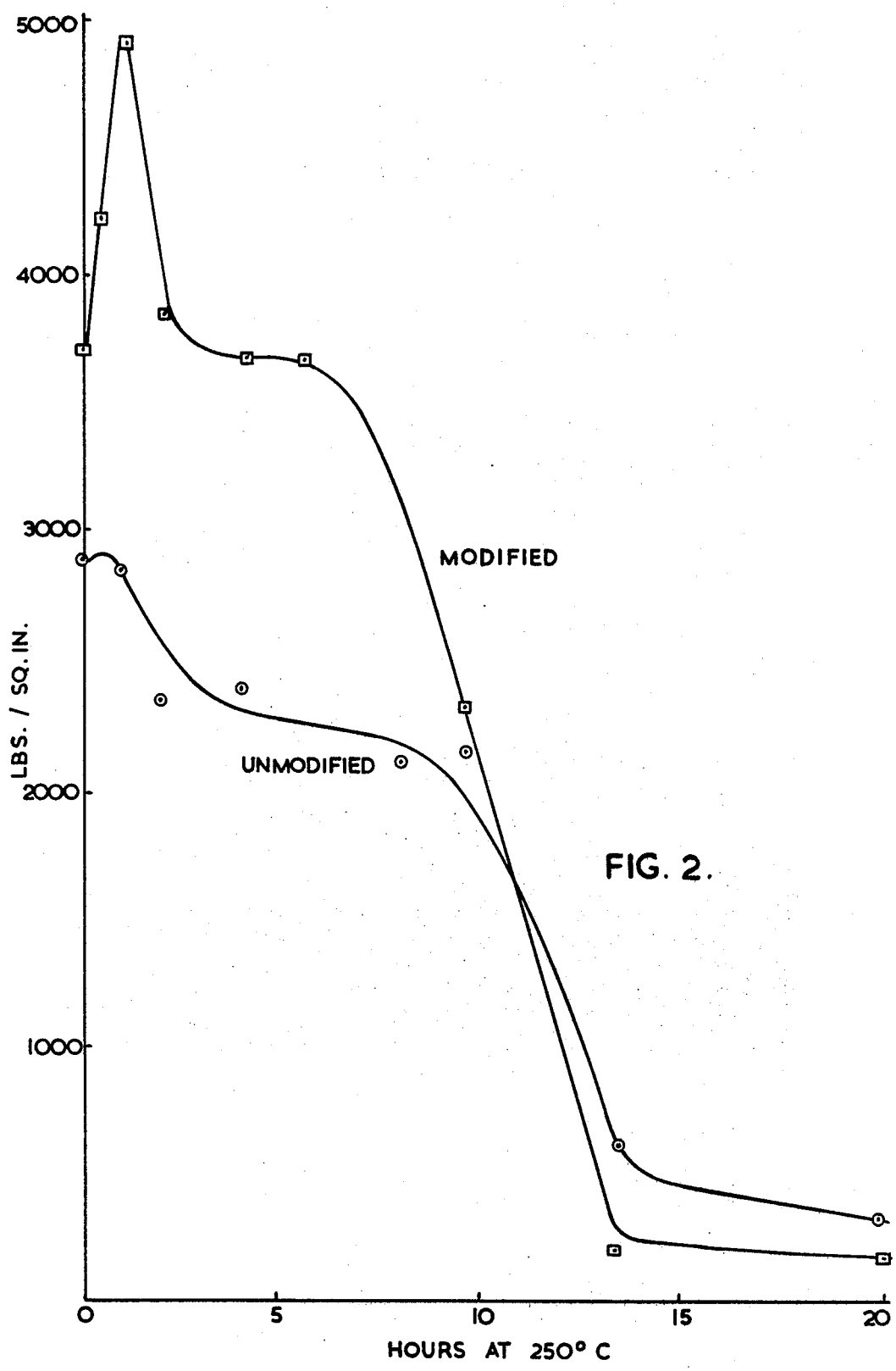
FIG. 2 shows similar results obtained at 250° C.

The process of Example 1 was repeated at 5° C using butadiene, added as a cooled liquid, in place of isoprene. After adding the sodium the nitrogen flow was stopped and 21.6g (0.4 moles) of butadiene were added as a liquid (collected by condensation at − 70° C using a vacuum line) to the sealed flask. The total yield was 135 grms (84%) with approximately the same proportion of the phases as in example 1. The upper layer had an epoxy content of 1.56 equivs/kg and a degree of polymerisation of butadiene of about 8. The lower layer had an epoxy content of 4.35 equivs/kg and a DP of about 0.5.

The layers were blended together and used to bond test plates as in Example 1 using triethylamine tetramine cure with post cure for 2 hrs at 150° C. The average shear strength was 4380 psi (maximum 4580).

EXAMPLES 3-7

Example 1 was repeated with the amount of isoprene varied to give isoprene/DGBA ratios of 0.5, 0.75, 1.5, 2.0 and 2.5 to 1. The reaction proceeded similarly. The amount and average degrees of polymerisation (n in formular (1)) of the upper layer are given in table 3.

TABLE 3

| Example | Molar Ratio Iosprene/DGBA | Upper Layers As % (v/v) Of Total | DP (Isoprene Units) Of Upper Layer |
|---------|---------------------------|----------------------------------|------------------------------------|
| 3 | 0.5 : 1 | 10 | 6 |
| 4 | 0.75 : 1 | 13 | 6 |
| 1 | 1 : 1 | 21 | 6 |
| 5 | 1.5 : 1 | 28 | 8 |
| 6 | 2.0 : 1 | 44 | 8 |
| 7 | 2.5 : 1 | 50 | 6 |

EXAMPLE 8

The apparatus as used in Example 1 was charged with 1200 ml of tetrahydrofuran (THF) containing 300 grms (0.86 moles) of DGBA and cooled to 0° C whilst purified nitrogen was bubbled through to maintain an inert atmosphere. With the temperature maintained at 0° C and with constant stirring an excess (2.0 moles) of sliced sodium metal was added followed by a mixture of 58.5 g (0.86 moles) of distilled isoprene and 21.5 g (0.41 moles) of distilled acrylonitrile.

Following a short induction period, the surface of the sodium assumed a yellow aspect, indicating that reaction had commenced.

After about 6½ hours the reaction mixture became fairly viscous with signs of gel formation and the metal surface had reverted to a dull grey. The excess sodium was removed by filtration and washed with 800 mls of THF. The filtrate and washings were stirred with 2000 mls of 95% saturated brine and carefully neutralised with 10% (w/w) acetic acid in saturated brine to a final pH of about 7.

The phases were allowed to separate and the upper organic phase was dried with magnesium sulphate to give a clear deep red solution. This was filtered and the solvent removed in a vacuum evaporator.

The product was a deep orange liquid (97% recovery) having an epoxide value of about 3.6 equivalents per Kg (DGEBA = 5.25 Eq/Kg) and an acrylonitrile content of 4% by weight (original reagents = 6% acrylonitrile). The produce showed no signs of separation after standing at room temperature for at least 6 months.

The product was used to bond degreased and sandblasted mild steel test pieces as in Example 1 using either triethylene tetramine (TETA) curing at 80° C for 2 hours or diethylene glycol bispropylamine curing for 3 days at room temperature followed by 2 hours at 80° C. The shear strengths (average of 5 tests) are shown in Table 4.

The product was also used, with the same curing cycles to bond aluminium test pieces for a 90° peel test. Joints were prepared from two 254 mm (10 in) × 203 mm (8 in) sheets of aluminium (to British Standard 3L61) of 0.51 mm (24 SWG) and 2.06 mm (12 SWG) respectively.

The adhesive mixture was applied to each sheet over an area of 203 mm × 203 mm (8 in × 8 in) leaving an area of 203 mm × 51 mm (8 in × 2 in) unbonded. The two sheets were then assembled, held rigidly under pressure by two steel plates, and allowed to cure for the time stated above. Glue line thickness was controlled at 0.4 mm by inserting stainless steel wires at regular intervals along the 254 mm (10 in) length of the joint. To prevent resin adhering to the steel plates, thin "cellophane" sheets were placed between the various surfaces. After curing five 254 mm × 25.4 mm (10 in × 1 in) strips were cut from the sheet.

Testing of the strips was carried out using a Monsanto Type E tensometer. The unbonded 'tag' of the thinner member of the specimen was bent at an angle of 90° and loaded on to a special test fixture which ensured that the tail of the specimen was held at 90° to the axis of loading, before locking into the lower of the machine grips. The tensometer was adjusted to impart a peeling rate of 100 mm/min, and a graphic trace of load versus peeled distance was recorded. The trace for the first 25 mm was ignored and the results recorded as the minimum peel strength obtained for the following 150 mm of the bond line. Results are quoted in Table 4 in pounds per linear inch (pli).

EXAMPLES 9 to 12

Example 8 was repeated using 7.2 grms; 14.3 grm; 28.7 grm and 35.8 grm (0.14; 0.27; 0.54 and 0.68 moles) of acrylonitrile. The results are shown in Table 4.

EXAMPLE 13

The procedure of Example 8 was repeated up to the removal of the excess alkali metal except that the acrylonitrile was omitted. To the stirred filtrate and washings was slowly added, over 15 minutes, a solution of 21.5 g (0.41 moles) of acrylonitrile in 200 ml of THF. Stirring was continued for 3 hours at room temperature after which the product was worked up as in Example 1.

The product had an epoxide value of 3.48 Eq/Kg and an acrylonitrile content of about 4% weight. It was tested as in Example 1 and the results are shown in Table 4.

The invention has been illustrated by the use of DGBA and isoprene and butadiene and acrylonitrile as the optional nitrile-substituted alkene. It will, however, be appreciated that other polyepoxides, especially those commonly used in epoxy resins and other dienes and nitrile-substituted alkenes may readily be substituted for these in the process of the inventions. Similarly, lithium metal may be substituted for sodium, although sodium will generally be preferred due to its lower cost. Other electron donors may, of course, also be used.

TABLE 4

| Ex No | Moles of Isoprene | Moles of Acrylonitrile | Recovery % | Epox. Value equiv/Kg | Triethylene tetramine Peel Strength pli | Triethylene tetramine Shear Strength psi | diethylene glycol bis propylamine Peel Strength pli | diethylene glycol bis propylamine Shear Strength psi |
|---|---|---|---|---|---|---|---|---|
| 9  | 0.86 | 0.14 | 96 | 3.51 | 6[1] | 3990[2] | 9[1] | 4220 |
| 10 | 0.86 | 0.27 | 98 | 3.58 | 5[1] | 3720[2] | 7[1] | 4620[1] |
| 8  | 0.86 | 0.41 | 97 | 3.68 | 8[1] | 3630[2] | 9[1] | 4690[1] |
| 11 | 0.86 | 0.54 | 99 | 3.73 | 9[1] | 3710[2] | 9[1] | 4000[1] |
| 12 | 0.86 | 0.68 | 79 | 3.93 | 6[1] | 2510[1] | 8[1] | 4570[1] |
| 13 | 0.86 | 0.41 | 89 | 3.48 | 9[1] | 3870[2] | — | — |

NOTES:
Mode of Failure
[1]Adhesive
[2]Adesive/cohecive

We claim:

1. A process for the production of an epoxide material comprising reacting, under substantially anhydrous conditions in a polar aprotic solvent, a conjugated diene with an electron donor in the presence of an epoxy compound containing at least two epoxide groups to form an anionic intermediate consisting essentially of a polydiene chain having terminal epoxy group derived from said epoxy compound, and subsequently hydrolysing said anionic intermediate to form an epoxy-terminated polydiene, wherein there is incorporated into said anionic intermediate, prior to its hydrolysis to form said epoxy-terminated polymer, a nitrile-substituted alkene in a molar ratio of diene to nitrile-substituted alkene up to 10:1.

2. A process according to claim 1 wherein the molar ratio of diene to epoxy compound is less than 3:1.

3. A process according to claim 2 wherein said molar ratio is in the range 0.75:1 to 1.5:1.

4. A process according to claim 1 wherein the diene is selected from the group consisting of butadiene and isoprene.

5. A process according to claim 1 wherein the epoxy compound is a diepoxide.

6. A process according to claim 5 wherein the diepoxide is a diglycidyl ether.

7. A process according to claim 1 wherein the electron donor is an alkali metal.

8. A process according to claim 7 wherein the alkali metal is selected from the group consisting of lithium and sodium.

9. A process according to claim 1 wherein the polar aprotic solvent is selected from the group consisting of tetrahydrofuran, diglyme, dioxan and tetramethylene diamine.

10. A process according to claim 1 wherein said molar ratio is in the range 1:1 to 10:1.

11. A process according to claim 10 wherein the molar ratio is in the range 1:1 to 5:1.

12. A process according to claim 1 wherein the nitrile-substituted alkene is acrylonitrile.

13. A process for the production of an epoxide material comprising reacting, under substantially anhydrous conditions in a polar aprotic solvent, (a) a mixture of a conjugated diene with a nitrile-substituted alkene in a molar ratio of diene to nitrile-substituted alkene of up to 10:1, with (b) an electron donor, in the presence of (c) an epoxy compound having at least two epoxide groups, to form a polymeric anionic intermediate having terminal epoxy groups derived from the said epoxy compound and subsequently hydrolyzing said anionic intermediate to form an epoxy-terminated polymer.

14. An epoxide material having the formula

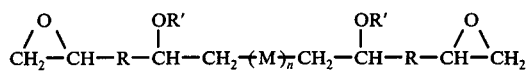

wherein R represents a divalent residue between two epoxide groups of a diepoxide, M represents divalent radical formed by addition to at least one alkene selected from the group consisting of conjugated dienes and nitrile-substituted alkenes, n has a number average value in the range 5 to 14 and R' represents a hydrogen atom.

15. An epoxide material according to claim 14 wherein M represents a radical formed by addition to a conjugated diene, $n$ has a number average value in the range 6 to 14, and R' represents a hydrogen atom.

16. An epoxide material according to claim 14 wherein R represents the divalent residue

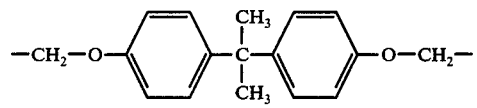

and M represents one or more divalent radicals selected from the group consisting of

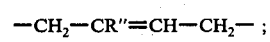

-continued $$-CH_2-CR''-\ ;\\ \quad\quad |\\ \quad\quad CH{=}CH_2$$

-continued $$\text{and } -CH_2-CH-\\ \quad\quad\quad\quad |\\ \quad\quad\quad\quad CR''{=}CH_2$$

wherein R″ is selected from the group consisting of a hydrogen atom and a methyl group.

17. An epoxide material according to claim 14 wherein said at least one alkene comprises a mixture of at least one conjugated diene with at least one nitrile-substituted alkene.

* * * * *